United States Patent
Ohtsuka et al.

(10) Patent No.: US 6,269,596 B1
(45) Date of Patent: *Aug. 7, 2001

(54) ROOF MEMBER AND MOUNTING METHOD THEREOF

(75) Inventors: Takashi Ohtsuka, Kyotanabe; Kimitoshi Fukae; Toshihiko Mimura, both of Nara; Masahiro Mori, Soraku-gun, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,422

(22) Filed: Jan. 30, 1998

(30) Foreign Application Priority Data

Feb. 5, 1997 (JP) .................................................. 9-022613

(51) Int. Cl.$^7$ ...................................................... E04D 13/18
(52) U.S. Cl. .............................. 52/173.3; 52/91.3; 52/464; 52/469; 136/244; 126/621
(58) Field of Search ................................ 52/173.3, 91.3, 52/461, 464, 469, 470; 136/244, 251, 291; 204/244; 126/623, 621

(56) References Cited

U.S. PATENT DOCUMENTS

| | | | | |
|---|---|---|---|---|
| 807,787 | * | 12/1905 | Staples | 52/461 X |
| 1,156,335 | * | 10/1915 | Waugh | 52/461 X |
| 2,855,871 | * | 10/1958 | Huntington | 52/469 X |
| 4,189,881 | * | 2/1980 | Hawley | 52/91.3 |
| 4,966,631 | * | 10/1990 | Matlin et al. | 136/244 |
| 5,092,939 | * | 3/1992 | Nath et al. | 52/173.3 X |
| 5,164,020 | * | 11/1992 | Wagner et al. | 52/173.3 X |
| 5,232,518 | * | 8/1993 | Nath et al. | 136/244 X |
| 5,409,549 | | 4/1995 | Mori . | |
| 5,433,259 | * | 7/1995 | Faludy | 136/291 X |
| 5,571,338 | * | 11/1996 | Kadonome et al. | 52/173.3 X |
| 5,589,006 | * | 12/1996 | Itoyama et al. | 52/173.3 X |

FOREIGN PATENT DOCUMENTS

| | | |
|---|---|---|
| 8-312088 | 11/1996 | (JP) . |
| 9-199747 | 7/1997 | (JP) . |
| WO 93/14525 | 7/1993 | (WO) . |

* cited by examiner

Primary Examiner—Beth A. Stephan
Assistant Examiner—Brian E. Glessner
(74) Attorney, Agent, or Firm—Fitzpatrick, Cella, Harper & Scinto

(57) ABSTRACT

Roof members of the present invention are those fixed to the roof, each roof member being a combination solar cell and roof member having a solar cell element and a metal reinforcing member, wherein a metal member is provided below the combination solar cell and roof member or a metal member is provided along an adjacent portion between adjacent combination solar cell and roof members, wherein the metal member is electrically conductive to metal reinforcing members of plural combination solar cell and roof members and wherein the metal member is electrically grounded. Provided based on this structure are the roof members easy to install and excellent in the external view and electric safety.

34 Claims, 13 Drawing Sheets

ROOF MEMBER AND MOUNTING METHOD THEREOF

BACKGROUND OF THE INVENTION

1. Field of the Invention

The present invention relates to a roof member incorporating a solar cell. More particularly, the invention concerns a roof member easy to install and excellent in electric safety and an electrically grounding method of a metal reinforcing member of a combination solar cell and roof member.

2. Related Background Art

In use of the solar cell the durability is required against influence from the external environments such as the temperature, the humidity, or impact. Therefore, the ordinary solar cell modules are constructed in such structure that a photovoltaic element is sealed in a filling material, the surface is covered with a weather-resistant film or glass as a protective material, and a metal reinforcing member is attached to the circumference or the back surface.

In terms of the electric safety, in order to avoid the worst case of electric shock when a man touches a part of the metal reinforcing member being the outside part of the solar cell module, a method for electrically grounding the outside part of solar cell module has been adopted heretofore.

FIGS. 13 and 14 show a conventional frame mount type solar cell device.

As seen in FIG. 13, the solar cell module array of this conventional example is constructed of a plurality of solar cell modules 1301 fixed to frame 1302.

As shown in the cross-sectional view of FIG. 14, a solar cell module used in this conventional example is constructed in such structure that a solar cell element 1401 is sealed in resin 1404, the top surface is protected by glass 1403, the bottom surface by weather-resistant film 1402, and an aluminum frame 1405 for reinforcement and mounting to the frame is attached to the circumference.

The electric grounding of such solar cell modules of the conventional example will be described referring to FIG. 14. In order to achieve electric conduction of the three members of the aluminum frame 1405 attached to the solar cell module, stainless-steel bolt 1407, and stainless-steel frame 1406 through the stainless-steel bolt 1407, a cable is attached to a part of the frame 1406 set on the roof and the cable is electrically grounded, thereby achieving the electric grounding of each solar cell module.

There is, however, no practical method developed yet for electric grounding of the metal reinforcing member adapted for a roof member and solar cell combination incorporating a roof member and a solar cell element without the frame described above. It is needless to mention that a method for providing each module with a cable for electric grounding greatly increases the cost and lowers the work efficiency, thus posing a problem.

The present invention provides a specific method for electric grounding of a combination solar cell and roof member (a solar-cell-incorporated roof material) installed on the roof.

SUMMARY OF THE INVENTION

Roof members of the present invention are those fixed to the roof, each roof member being a combination solar cell and roof member having a solar cell element and a metal reinforcing member, wherein a metal member is provided below the combination solar cell and roof member or a metal member is provided along an adjacent portion between adjacent combination solar cell and roof members, wherein the metal member is made electrically conductive to metal reinforcing members of plural combination solar cell and roof members and wherein the metal member is electrically grounded.

The metal member is preferably a metal sheet disposed below the combination solar cell and roof member, a metal sheet disposed between adjacent combination solar cell and roof members, or a metal sheet mounted on a wood rafter. The metal member is preferably one also serving as a metal rafter, a long retaining clip, or a cover for the adjacent portion of the combination solar cell and roof member.

Further, electric conduction is preferably achieved between the metal reinforcing member of combination solar cell and roof member and the metal member provided on the roof substrate through a partially conductive retaining clip.

It can also be contemplated that the retaining clip has a screw and that the electric condition is made surer between the metal reinforcing member of the combination solar cell and roof member and the retaining clip through the screw.

DESCRIPTION OF THE PREFERRED EMBODIMENTS

Figure 4:
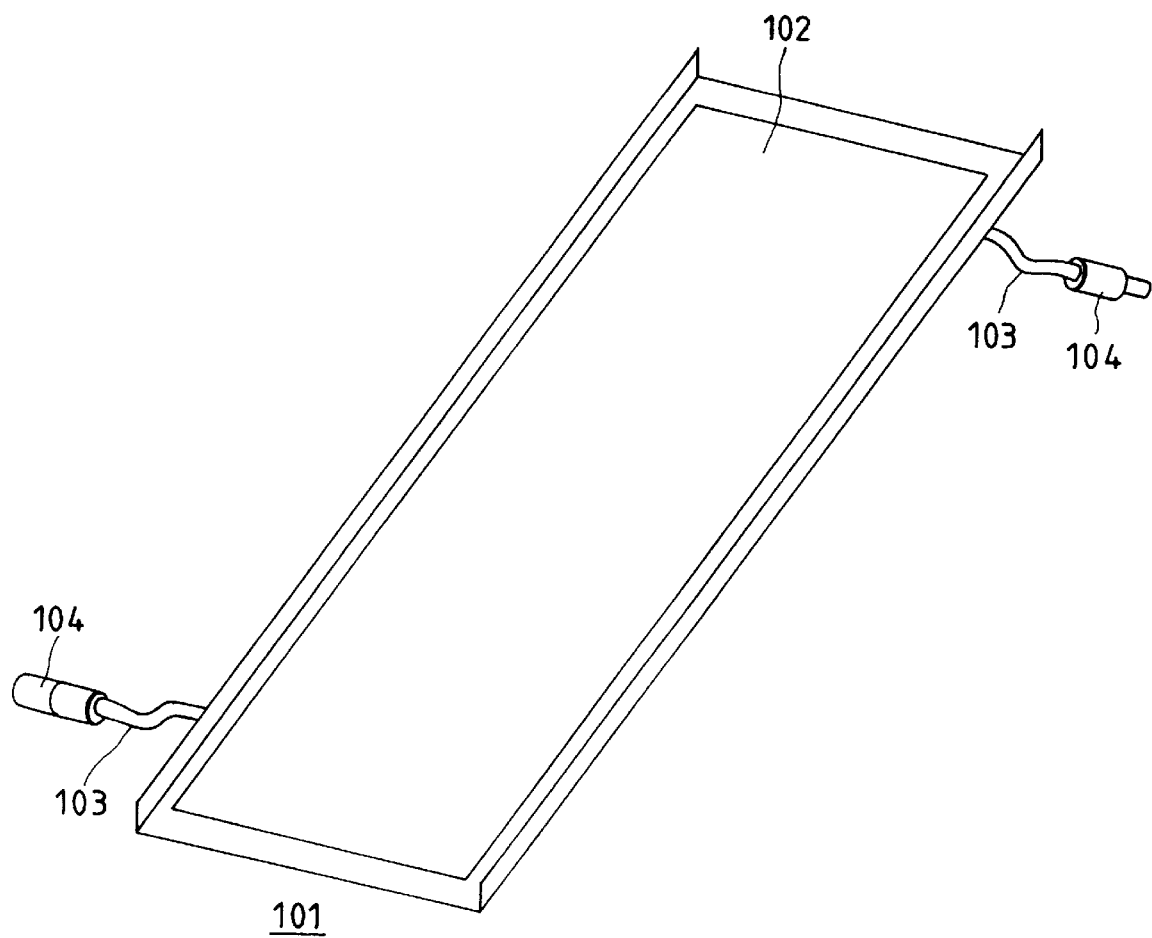
FIG. 4 is an external view of a combination solar cell and roof member (of the batten seam type) of the present invention.

A combination solar cell and roof member, or panel, of the present invention incorporates a roof member and a solar cell element to compose a roof member and an example of the shape thereof is shown in FIG. 4.

Figure 1:
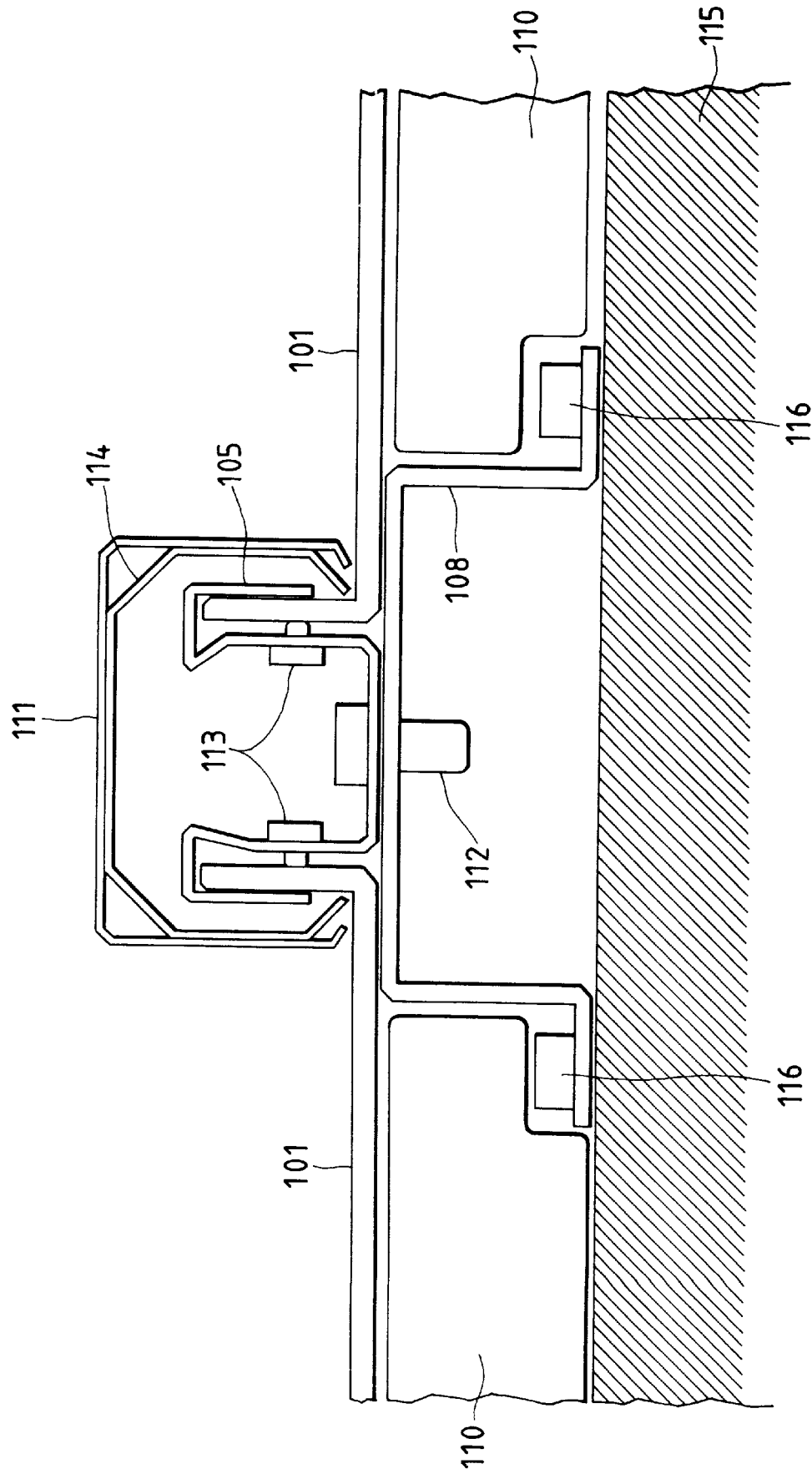
FIG. 1 is a cross-sectional view to show a mounted state of batten seam type roof members of the present invention.

FIG. 1 is a cross-sectional view to show a mounted state of the roof members shown in FIG. 4. Metal rafter 108 is prepared as a metal member located below the combination solar cell and roof members 101 and is fixed on purlins 115 as shown in FIG. 1. Heat insulating material 110 is placed and fixed between metal rafters 108. Each combination solar cell and roof member 101 is retained by retaining clip 105 to be fixed to the metal rafter 108. Screws 113 are attached to the retaining clip 105 so that the tip thereof is urged against the metal reinforcing member of combination solar cell and roof member to achieve electric connection. Base metal member 114 and decorative cover 111 are mounted over the fixing portion of the retaining clip. Further, a cable is attached to each metal rafter, thereby achieving electric grounding.

A substrate roof or the like may be provided underneath the roof members in order to enhance fire protection and waterproofing, thereby forming the structure of double-layered roof.

(Retaining Clip)

Figure 2:
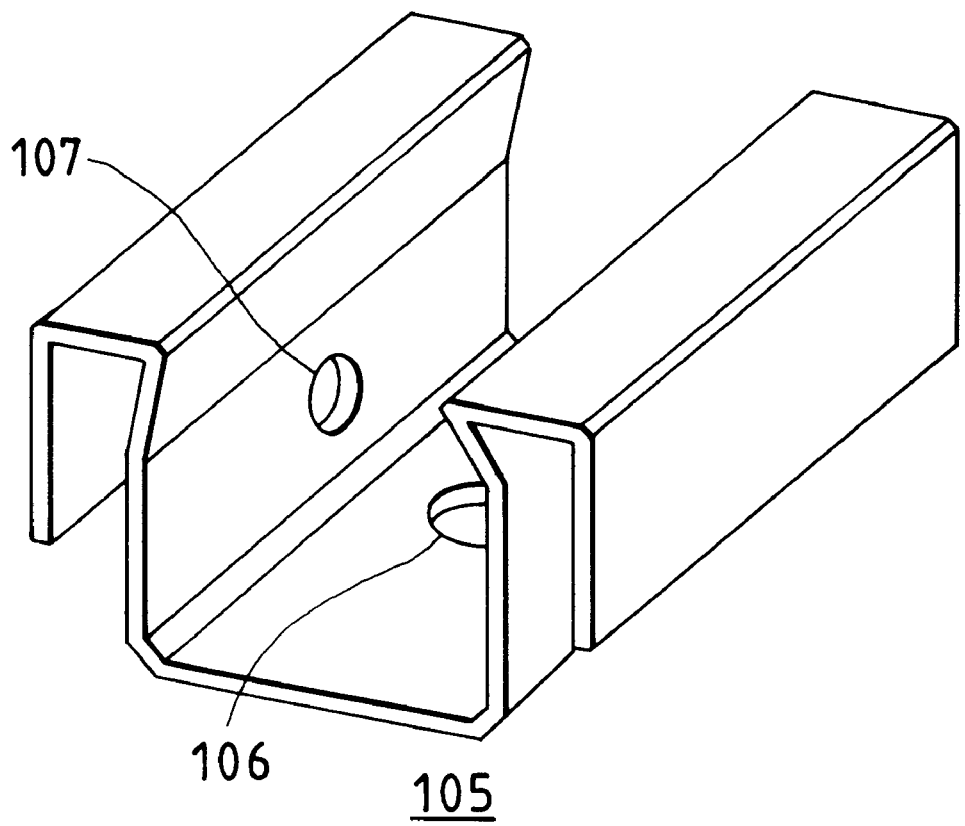
FIG. 2 is an external view of a retaining clip (for the batten seam type) according to the present invention.

An example of the retaining clip is shown in FIG. 2. As illustrated, the retaining clip 105 has a portion to be fixed to the rafter and portions for retaining the combination solar cell and roof member. The retaining clip is fixed to a support member such as the rafter by use of a through hole of 106 in the drawing. In the drawing mating part 107 is a portion to which a screw for assuring electric conduction to the retaining clip is attached.

Preferably, the retaining clip is tapped for fixing the screw to the retaining clip; or another means that may be employed is, for example, welding a nut to the retaining clip. A tapping screw may be used.

Another conceivable means for making the electric conduction surer is, for example, a method for forming a through hole in the combination solar cell and roof member, inserting the screw therein, and coupling the screw with a nut while pinching the metal reinforcing member portion of combination solar cell and roof member and the retaining clip.

It is also contemplated that reliability of the electric conduction is enhanced by a method for partly welding the metal reinforcing member of combination solar cell and roof member to the retaining clip, a method for bonding them to each other with a conductive adhesive, or the like.

Another method contemplated is a method for placing a conductive plate spring member made of a conductive rubber or of a thin metal sheet such as stainless steel between the retaining clip and the metal reinforcing member of combination solar cell and roof member.

Still another method contemplated is a method for applying tin plating to contact portions between the retaining clip and the metal reinforcing member of combination solar cell and roof member.

Since the retaining clip needs to have the electrically conductive property to the metal reinforcing member of combination solar cell and roof member, it is desired to have the electrically conductive property at least in a part thereof. Further, since the retaining clip has the function to install the combination solar cell and roof member on the rafter, it is desired to have strength enough therefor.

Although the drawing shows the partial retaining clip for retaining a part of the combination solar cell and roof member, the strength may be further enhanced, for example, by using a long retaining clip for retaining the entire length of one side of the combination solar cell and roof member.

Further, the combination solar cell and roof member may be retained at plural portions or at one portion.

When one combination solar cell and roof member is fixed by plural retaining clips, the electric conduction between the metal reinforcing member of combination solar cell and roof member and the retaining clip needs to be given at least one portion for each solar cell module, and the other retaining clips for simply retaining the combination solar cell and roof member may be those without account of electric conduction.

The retaining clip can be made by processing a metal sheet. Specifically, the retaining clip can be prepared, for example, by press working or folding of a stainless steel sheet or a galvanized iron sheet 0.8 mm or 1 mm thick. Further, the retaining clip can also be made of a composite material such as a lamination with a silver sheet or a copper sheet in order to increase the electric conductivity.

Further conceivable means for electrically grounding the retaining clip include a method for preliminarily attaching a cable for electric grounding to the retaining clip or a method for fixing the retaining clip to a conductive rafter by use of a bolt or the like and electrically grounding the rafter.

(Metal Member Placed on Roof Substrate)

Examples of the metal member placed on the roof substrate are a metal rafter, a wood rafter with a metal sheet attached thereto, a metal sheet cut in a rectangular shape, and so on. One of these is selected considering compatibility with the construction method of the substrate of building.

Use of the metal rafter is particularly preferred in the case of reinforcement-structure buildings. In this case the metal rafter functions not only as an electrically conductive material, but also as a structural material. The metal rafter may be made of light gage steel, hat steel, lip channel steel, H-steel, or the like obtained by folding of a thin steel sheet.

The combination of the metal sheet with the ordinary wood rafter is particularly suitable for applications to timber-structure buildings. The cross section of this metal sheet is preferably determined as large as possible. In this case, in order to reduce work amounts on the roof, the metal sheet is preferably preliminarily incorporated with the rafter. The method of incorporation may be a method for bending the metal sheet in a U-shape to cover the rafter, or a method for fixing the rafter and the metal sheet having the equal or near width by screwing. This permits employment of a fixing method such as nailing, taking advantage of the properties of wood, and can decrease the weight. The metal sheet may be a galvanized iron sheet, a stainless steel sheet, or the like.

For any roofs having various roof substrates, the same effect can be achieved as to the electric grounding of the metal reinforcing member of combination solar cell and roof member by preparing the metal sheet having a small width and a length ranging from the edge to the edge of roof below the roof member. If this metal sheet is installed in a network pattern, the electric grounding can be done readily for all the combination solar cell and roof members on the roof.

The electric grounding of the metal members each placed on the roof substrate will be described with an example using the metal rafters.

The electric grounding can be achieved, for example, by a method for attaching a cable to each metal rafter and guiding the cables into the interior in the same manner as the output cables of solar batteries to electrically ground them.

A means for achieving electric conduction between the metal rafters may be adopted in order to realize the electric grounding by such attachment of cable at only one portion. For example, in the case wherein the rafters are fixed to metal purlins or the like nearly perpendicularly crossing the rafters with bolts or the like, the electric grounding between the rafters can be achieved by electric conduction between the metal rafters and the metal purlins with the bolts and by electric grounding of the purlins.

Further, similarly, the electric conduction may be attained between the rafters by use of an eave edge plate, a verge plate, a ridge cover, a dummy plate, or the like attached to the circumference of the roof.

These are similarly applicable not only for the metal rafters, but also for the structure in which the metal sheet is attached to the wood rafter, and the metal sheet placed so as to extend between both edges of the roof like the rafters though not having the sufficient strength for the structural material. The above arrangements make it possible to electrically ground the metal reinforcing members of the all combination solar cell and roof members.

The rafters may be provided with through holes or grooves through which the output cables between the combination solar cell and roof members pass, if necessary.

(Metal Member Placed along an Adjacent Portion of Combination Solar Cell and Roof Member)

The metal member placed along the adjacent portion of the combination solar cell and roof member can be a metal sheet installed by a method for fixing the metal sheet, utilizing the space of the adjacent portion. In the roof form such as the batten-seamed roof, the metal sheet of the U-shape may be preliminarily incorporated with the batten.

It may also be a long retaining clip also functioning to fix the combination solar cell and roof member or may also function as a decorative cover of the adjacent portion.

Its length is preferably enough to stretch from the edge to the edge of the roof. The electric conduction with the combination solar cell and roof members and electric grounding are the same as in the case of the metal member mounted on the roof substrate and located below the combination solar cell and roof member.

(Combination Solar Cell and Roof Member)

Figure 10:
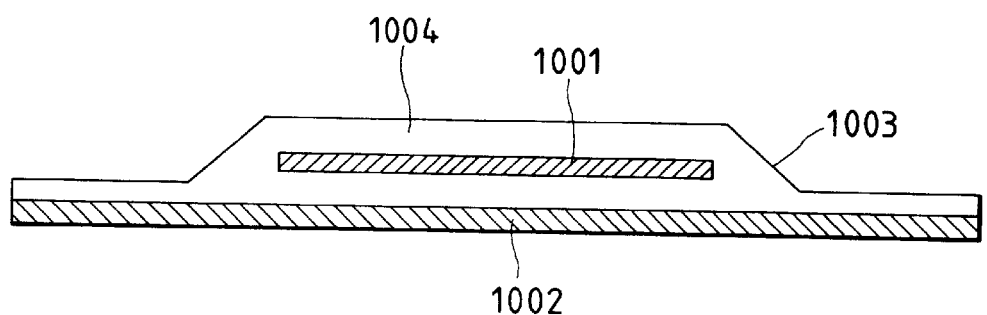
FIG. 10 is a cross-sectional, structural drawing of a combination solar cell and roof member of the present invention.

A schematic, cross-sectional, structural view of the combination solar cell and roof member is next shown in FIG. 10. In FIG. 10, reference numeral 1001 designates a photovoltaic element, 1002 a bottom-surface reinforcing metal sheet, 1003 a weather-resistant film, and 1004 a filling material. In the combination solar cell and roof member of the present invention the metal reinforcing member is preferably used in order to assure the strength of the roof.

The metal reinforcing member may be a metal frame member of aluminum or stainless steel in a nearly U-shape, attached to a part or the circumference, but a more preferred member is a metal sheet or a metal reinforcing member formed of the metal sheet in a box shape or in various roof shapes.

The reason of this is that absence of frame can decrease the weight and the cost. Use of the metal sheets formed in the shapes conventionally used for the metal roof members permits the external view and the mounting method close to those preferred heretofore, and facilitates mixed roofing or the like of the combination solar cell and roof members with the metal roof members.

Desired conditions of the metal sheet are having sufficient strength as a structure, being bendable and excellent in processability, having high weather resistance and corrosion resistance, having high adhesive strength to an adhesive for bonding the solar cell element, and so on. Another desired condition is that color tones are selectable, because the tone will affect the external view, depending upon the installation form.

The metal reinforcing member is selected from steel sheets, special plated steel sheets, laminate/coated steel sheets, or the like, specifically, such as a copper plate, an aluminum alloy sheet, a lead sheet, a zinc sheet, a titanium sheet, a stainless steel sheet, a galvanized steel sheet, or a zinc-aluminum alloy plated steel sheet. The thickness of these is preferably 0.2 mm–2.0 mm. It is preferably colored with a polyester-resin-based paint, an epoxyresin-based paint or the like, but, for achieving surer electric conduction to the retaining clip, the coating film may be taken away in a portion for electric conduction to the retaining clip. Further, it is also permissible to use a metal sheet or the like coated only in a portion that could affect the external view of the roof after mounting.

Since the combination solar cell and roof members are used outdoor, they need to have sufficient weather resistance and thus need to have a protective material for protecting the top surface portion. This surface protective material is preferably excellent in transparency and weather resistance and it preferably has volatility in order to prevent pollution of the surface.

The surface protective material is a glass film or a weather-resistant film. A particularly preferred material is the weather-resistant film that can readily address the weight reduction and the scale increase of combination solar cell and roof member.

The solar cell element is preferably sealed in the filling material in order to protect the solar cell element from the external environments such as the impact. Specific examples of the filling material are ethylene-vinyl acetate copolymer (EVA), ethylene-acrylate copolymer resin (EEA), polyvinylbutyral (PVB), silicone resin, and acrylic resin.

(Photovoltaic Element)

Figure 9:
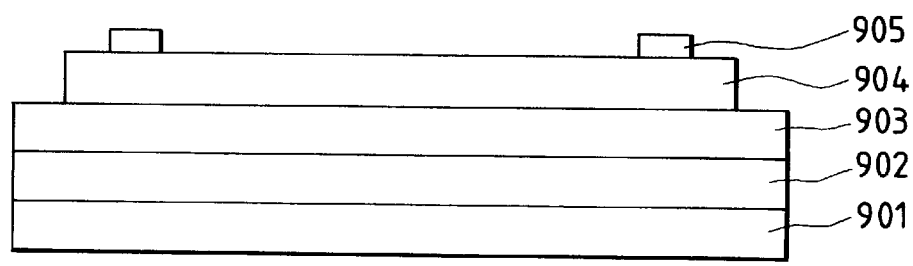
FIG. 9 is a cross-sectional view to show an example of the solar cell element according to the present invention.

Thin-film semiconductor solar cells of the non-monocrystalline type are particularly suitable as solar cell elements used in the roof members of the present invention. An example of the solar cell element is shown in FIG. 9. In FIG. 9, numeral 901 denotes a substrate, 902 a bottom reflecting layer, 903 a semiconductor photoactive layer, 904 a transparent, conductive layer, and 905 a collector electrode. The solar cell element may be of the structure in which light is incident from the substrate side. A material for the semiconductor photoactive layer can be selected from silicon-based materials and compound-based materials, and the semiconductor junction can be selected from the pn junction, the pin junction, and the Schottky junction.

EXAMPLES

Example 1

The roof members shown in FIG. 4 were produced and mounted so as to achieve good grounding.

First, as shown in FIG. 10, amorphous silicon solar cell element 1001 was sandwiched between sheets of EVA (a weather-resistant grade of ethylene-vinyl acetate copolymer; trade name: Evaflex 150, available from Mitsui-DuPont Chemical Inc.) on a galvanized steel sheet coated with a polyester resin (trade name: Color Grip, available from Daido Kohan Kabushiki Kaisha) 1002 having the thickness of 0.4 mm, and then ETFE (ethylene-tetrafluoroethylene; trade name: Aflex, available from Asahi Glass) 1004 was placed thereon. These were pressed in vacuum and heated to form an integral body incorporating the steel sheet and solar cell element. Then junction boxes and cables with a connector for leading the power from the solar cell element to the outside were attached to the back side.

Further, two opposite sides of the steel sheet were bent into a standing-up shape on the top surface side as shown in FIG. 4. The bending was conducted by a roll forming machine.

Figure 3:
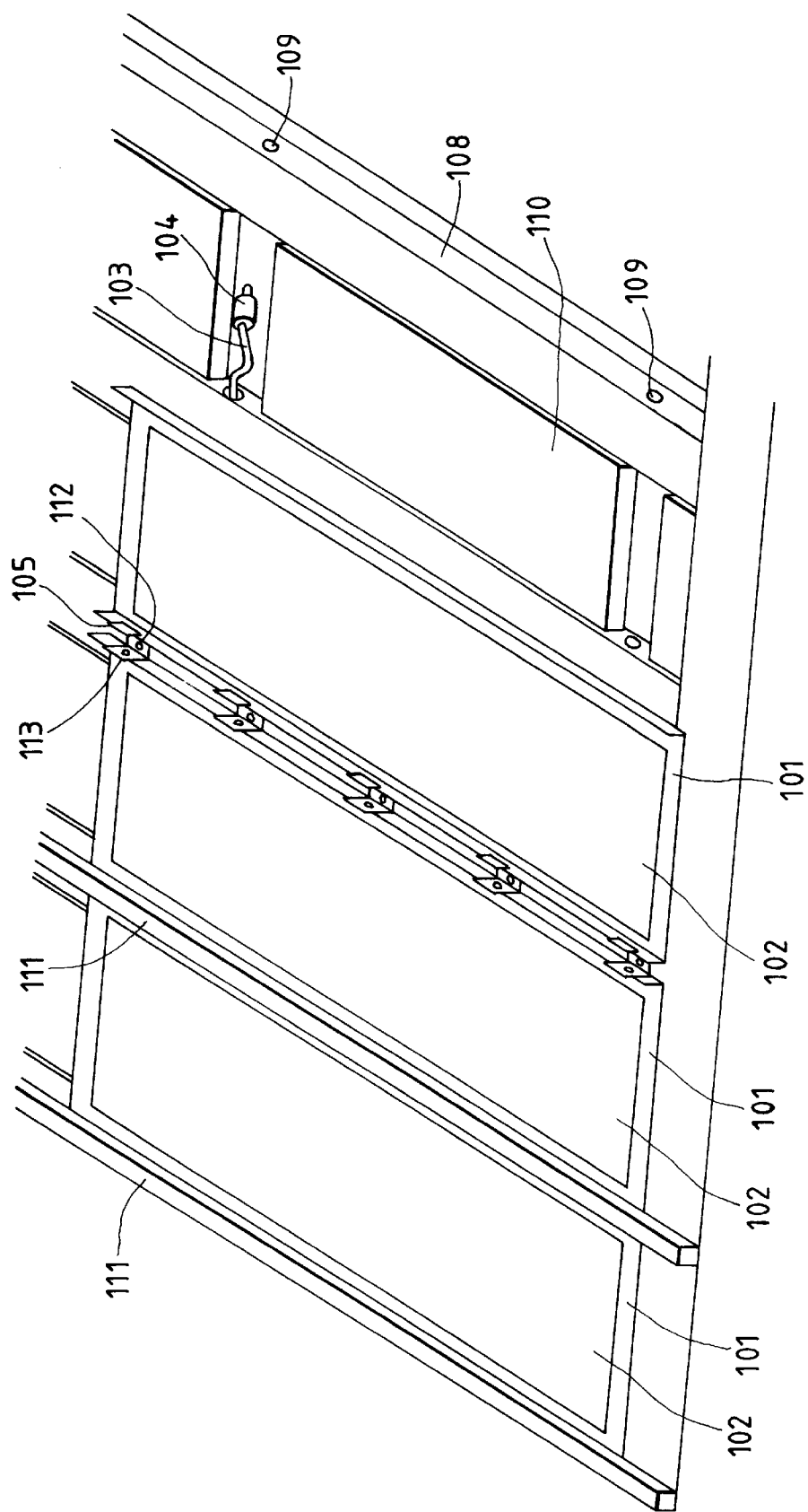
FIG. 3 is an external view to explain a mounting method of batten seam type roof members of the present invention.

FIG. 3 shows a method for mounting the combination solar cell and roof members of the present example on the roof. A plurality of metal rafters 108 were placed in parallel on metal purlins and were fixed with drill screws. An excelsior board was placed and fixed as a heat insulating member 110 between the metal rafters 108 on the purlins. The metal rafters 108 were provided with through holes 109 for connection between combination solar cell and roof members 101, and spaces for cable 103 to pass were given in the heat insulating member 110.

Then the combination solar cell and roof members 101 were placed on the rafters 108 and electric connection was made by connecting the connectors 104 between the combination solar cell and roof members 101. The combination solar cell and roof members 101 were retained by retaining clips 105 shown in FIG. 2 and were fixed to the rafters 108 with drill screws 112. Further, the combination solar cell and roof members 101 were urged and fixed at the mating portions 113 of retaining clips 105 by screws.

This fixing by screw was done at one portion for each of the combination solar cell and roof members.

Subsequently, base metal members 114 were fitted and fixed and then decorative covers 111 were attached over them as seen in the cross-sectional view of FIG. 1.

Finally, a polyvinyl chloride wire of 5.5 mm$^2$ was attached by a stainless-steel bolt to the vicinity of the ridge-side edge of the center metal rafter, the wire was then led from the ridge side of the roof into the interior in the same manner as the output cables from the solar cells, and it was electrically grounded.

The route for electric grounding of each combination solar cell and roof member in the present example will be described referring to FIG. 1. First, electric conduction is achieved from the metal reinforcing member of the combination solar cell and roof member 101 via the screw 113, the retaining clip 105, and the tapping bolt 112 for fixing the retaining clip, to the metal rafter 108. Since the metal rafters 108 extend from the edge of the ridge to the edge of the eave, the metal reinforcing members of the combination solar cell and roof members 101 arranged in the eave-ridge direction can be made electrically conductive to one metal rafter 108.

Each metal rafter 108 is electrically conductive to the metal purlins 115 via the tapping screws 116. Since the metal purlins 115 extend from the left and right edges of the roof, the all metal purlins arranged horizontally in parallel can also be made electrically conductive similarly. As a result, the metal reinforcing members of the combination solar cell and roof members 101 are made electrically conductive to one metal rafter 108 and, finally, are electrically grounded through a wire attached to that metal rafter.

In the present invention the combination solar cell and roof members were installed without any frame on the laid roof, whereby the cost was able to be decreased greatly and the preferred exterior view was achieved with excellent unification of the roof and building.

In addition, high work efficiency was achieved by the electric conduction among the metal part of combination solar cell and roof member, the retaining clip, and the metal rafter, and the electric grounding was made at low cost for the metal outside portions of the individual combination solar cell and roof members. Further, by attaching the screw to the retaining clip, reliability of electric conduction was enhanced to the metal reinforcing member of combination solar cell and roof member.

Since the combination solar cell and roof member had the metal sheet on the bottom surface, it had the form similar to that of the conventional metal roof, and was fixed by the retaining clips, installation was able to be done with high reliability and work efficiency.

Example 2

The combination solar cell and roof member of the present example is constructed substantially in the same structure as in Example 1 except that the roof member is of the configuration of installation of a horizontal roofing type roof.

Figure 5:
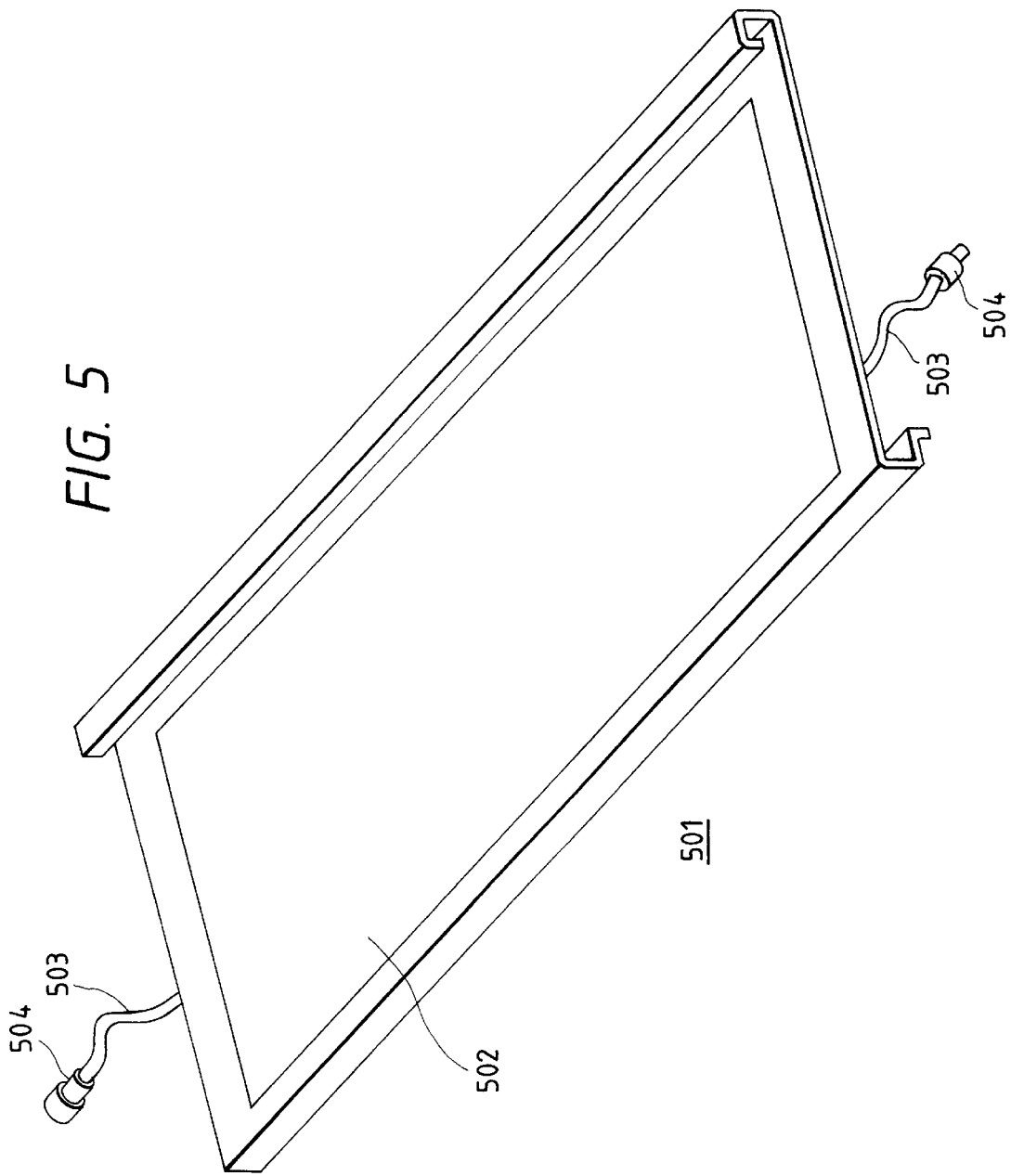
FIG. 5 is an external view of a combination solar cell and roof member (of the horizontal roofing type) of the present invention.

The integral combination of the metal reinforcing member and the solar cell element as shown in FIG. 10 was bent in the shape shown in FIG. 5. With the combination solar cell and roof member, the edge located on the eave side when mounted on the roof was bent toward the bottom side of the combination solar cell and roof member 501 to form an eave-side engaging portion of a U-shape and the edge located on the ridge side was bent upward and then folded back to form a ridge-side engaging portion.

Then junction boxes and cables 503 with a connector 504 for electric connection between solar cells were attached in the same manner as in Example 1.

Figure 7:
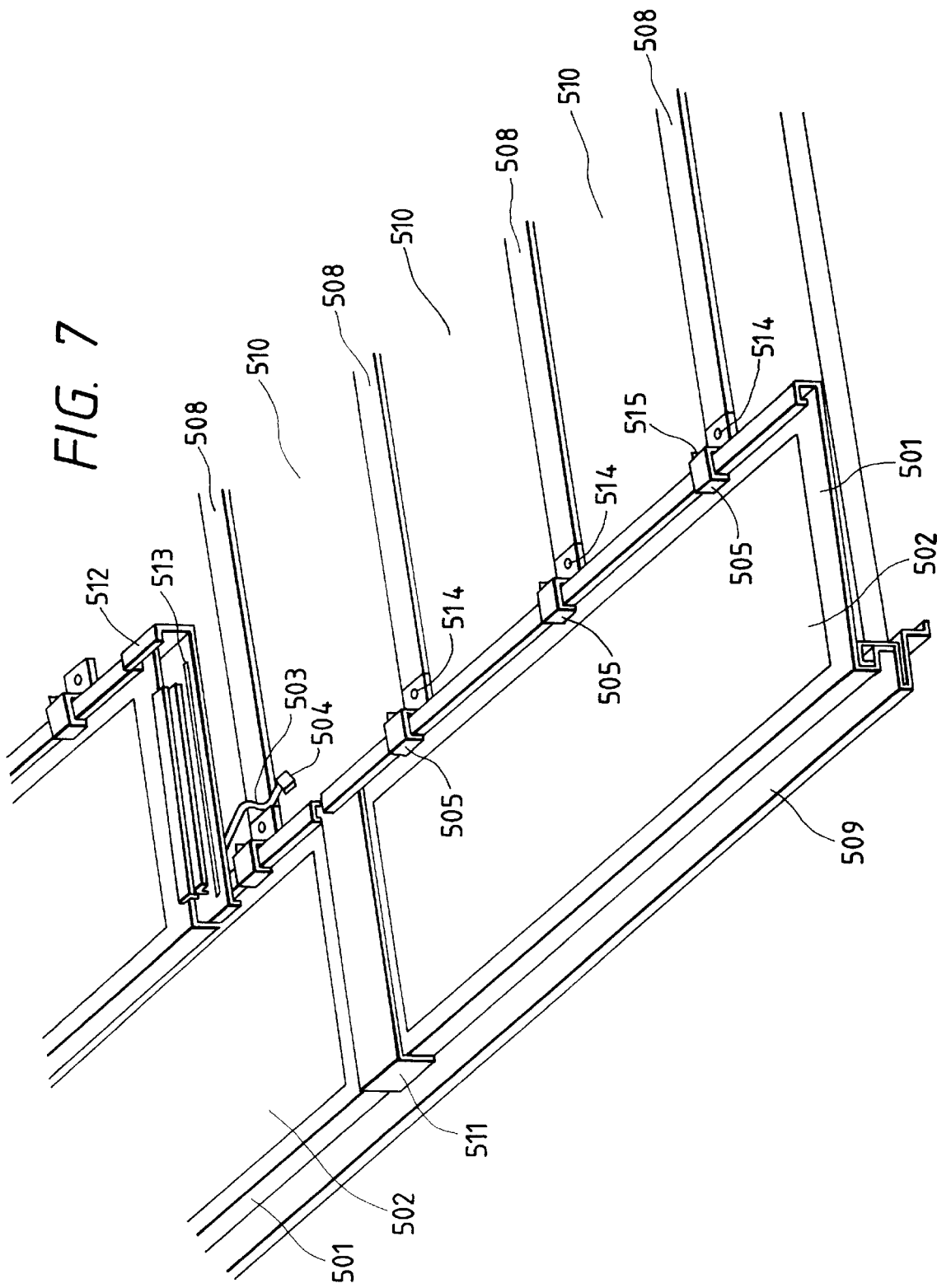
FIG. 7 is an external view to explain a mounting method of horizontal roofing type roof members of the present invention.

Mounting of the combination solar cell and roof member will be described referring to FIGS. 7 and 8.

Members of hat steel, obtained by bending a galvanized steel sheet 0.8 mm thick, were attached as metal rafters 508 onto the metal purlins with tapping screws.

The excelsior board as heat insulating member 510 was placed and fixed between the rafters.

Then the combination solar cell and roof members 501 were fixed on the roof in the following manner. Fixing of the solar cell modules was first started from the eave side; the combination solar cell and roof members in a horizontal line were fixed on the eave side and thereafter the fixing was successively conducted line by line of combination solar cell and roof members toward the ridge side.

Electric connection between combination solar cell and roof members 501 was achieved by successively connecting the cables 503 with connector 504 while fixing the combination solar cell and roof members.

The most-eave-side combination solar cell and roof members 501 were made to engage eave arabesque 509 and the roof members t hereafter were made to engage those 501 next thereto on the eave side from thereabove. The ridge-side engaging portions standing on the ridge side were retained by retaining clips 505 from thereabove and the base of each retaining clip 505 was fixed to the metal rafter 508 with tapping screw 514.

Figure 6:
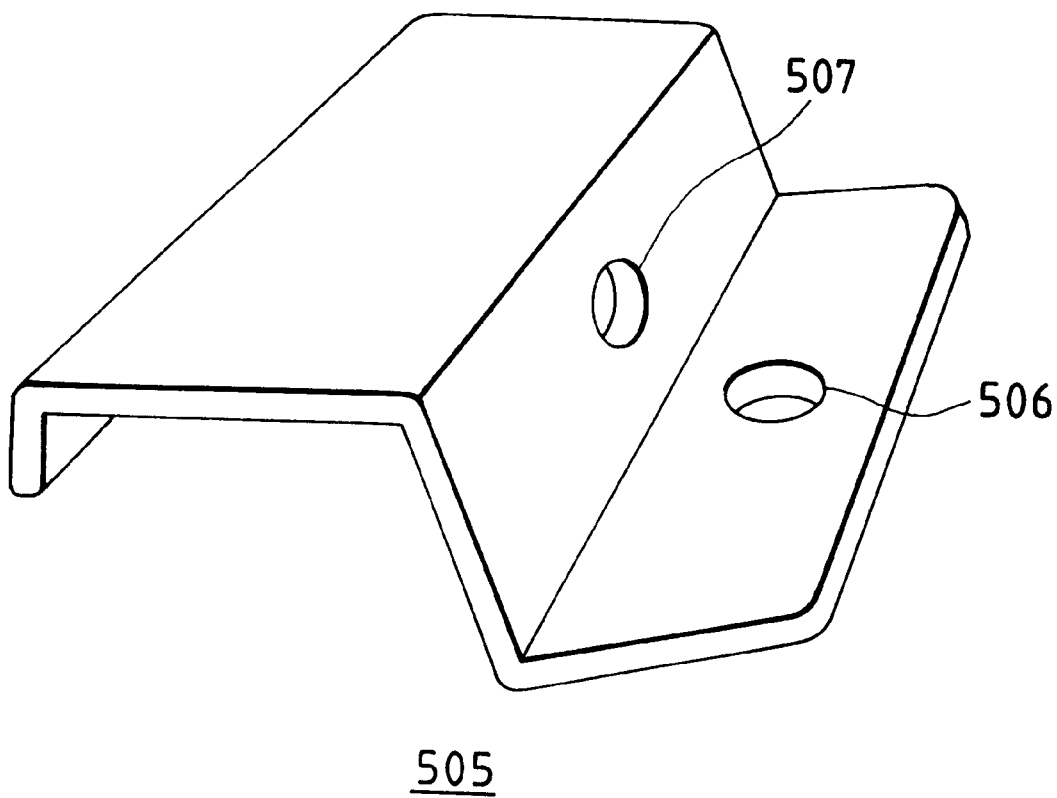
FIG. 6 is an external view of a retaining clip (for the horizontal roofing type) according to the present invention.

A retaining clip 505 has a through hole 506 through which a tapping screw 514 for fixing the retaining clip to the metal rafter 508 and a mating portion 507 to which a screw for making the electric conduction to the module surer is attached, as shown in FIG. 6.

Figure 8:
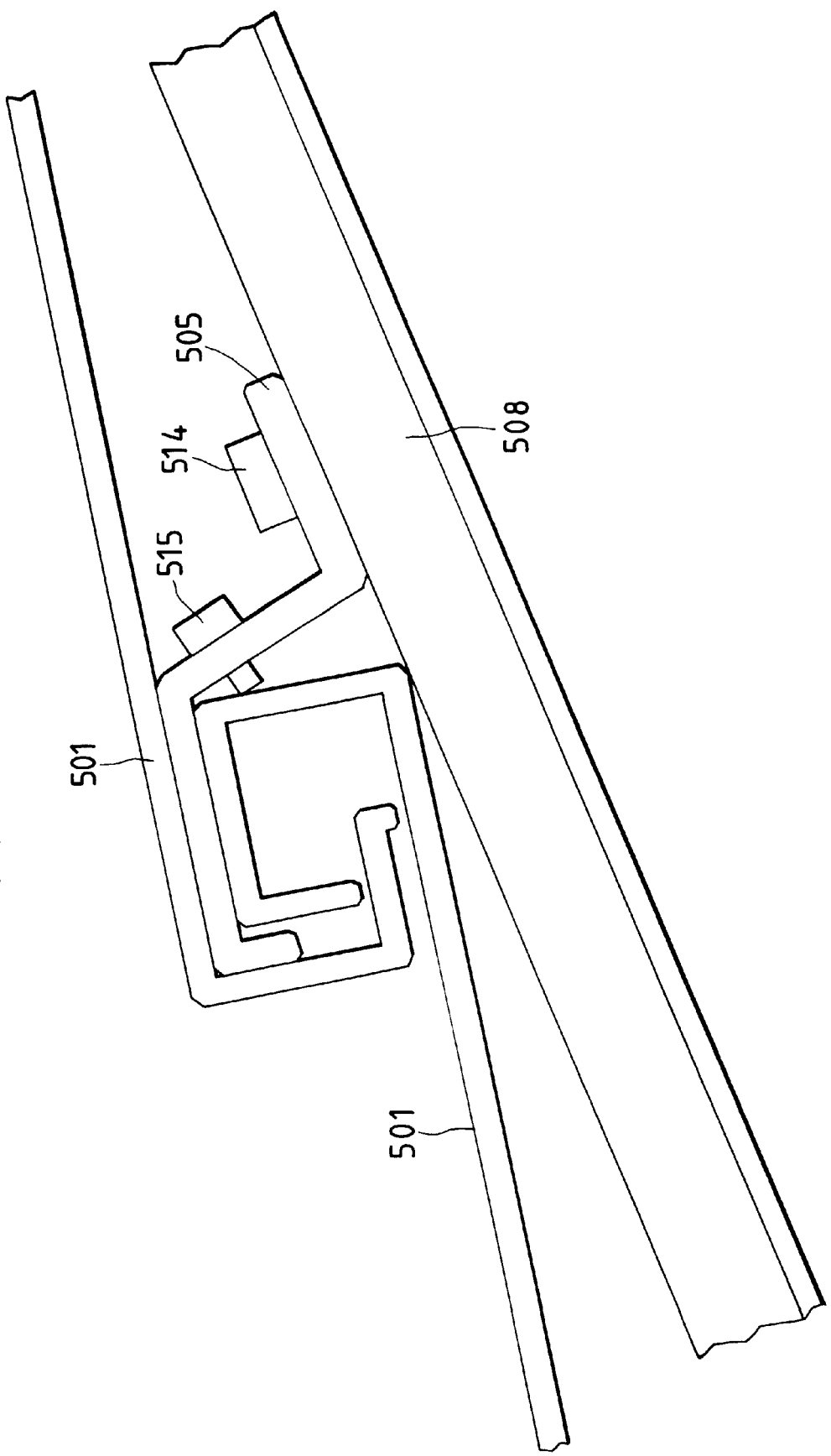
FIG. 8 is a cross-sectional view to show a mounted state of horizontal roofing type roof members of the present invention.

As shown in the schematic, cross-sectional view of FIG. 8, conductive screw 515 was tightened so as to be urged against the combination solar cell and roof member, after the fixation of the retaining clip 505. This tightening of the screw 515 made electric conduction surer between the combination solar cell and roof member 501 and the retaining clip 505.

In this way the combination solar cell and roof members were installed line by line from the eave side to the ridge side.

A cable was attached to the ridge-side end of the metal rafter 508 and was guided through a hole on a sheathing roof board into the interior in the same manner as the output cables of solar cells.

The route for electric grounding of each combination solar cell and roof member in the present example will be described. First, electric conduction is achieved from the metal reinforcing member of the combination solar cell and roof member via the screw, the retaining clip, and the tapping bolt for fixing the retaining clip, to the metal rafter. Since the metal rafters extend from the edge of the ridge to the edge of the eave, the metal reinforcing members of the combination solar cell and roof members arranged in the eave-ridge direction can be made electrically conductive to one metal rafter. Each metal rafter is electrically conductive to the metal purlins via the tapping screws. Since the metal purlins extend from the left and right edges of the roof, the all metal purlins arranged horizontally in parallel can also be made electrically conductive similarly. As a result, the metal reinforcing members of the combination solar cell and roof members are made electrically conductive to one metal rafter and, finally, are electrically grounded through the wire attached to that metal rafter.

The roof members of the present example realized the mounting of combination solar cell and roof members and the electric grounding of the metal outside portions of combination solar cell and roof members with high work efficiency and at low cost, in the same manner as in Example 1, and the roof members had the excellent external view of the horizontal roofing type roof having the nearly stepped external view and being employed preferentially in the conventional buildings.

Example 3

The combination solar cell and roof member array of the present example is substantially the same as in Example 1 except that wood rafters are covered by a stainless steel sheet to achieve electric conduction between the metal reinforcing members of combination solar cell and roof members.

Figure 11:
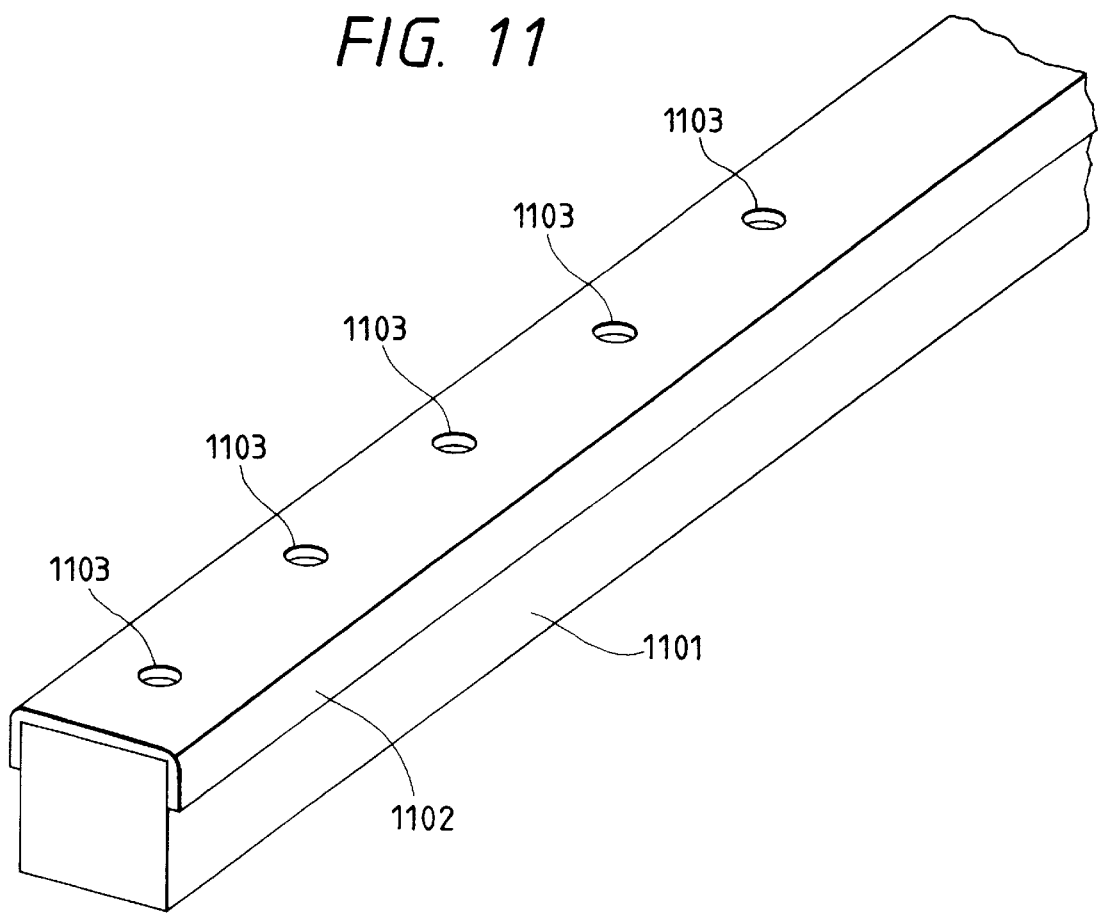
FIG. 11 is a perspective view of an example of a rafter according to the present invention.

As shown in FIG. 11, a rafter 1101 is covered with a stainless steel sheet as a conductive portion 1102, which is a means for achieving conduction to retaining clips. This stainless steel sheet is provided with through holes 1103 in portions where screws or nails need to be put in order to enhance work efficiency of fixing of modules or the like.

Figure 12:
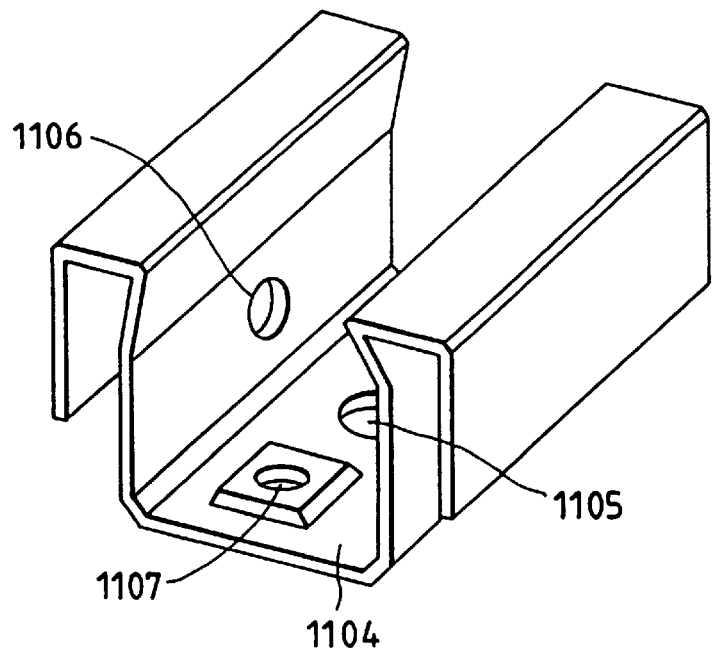
FIG. 12 is a perspective view of an example of a retaining clip according to the present invention.
Figure 13:
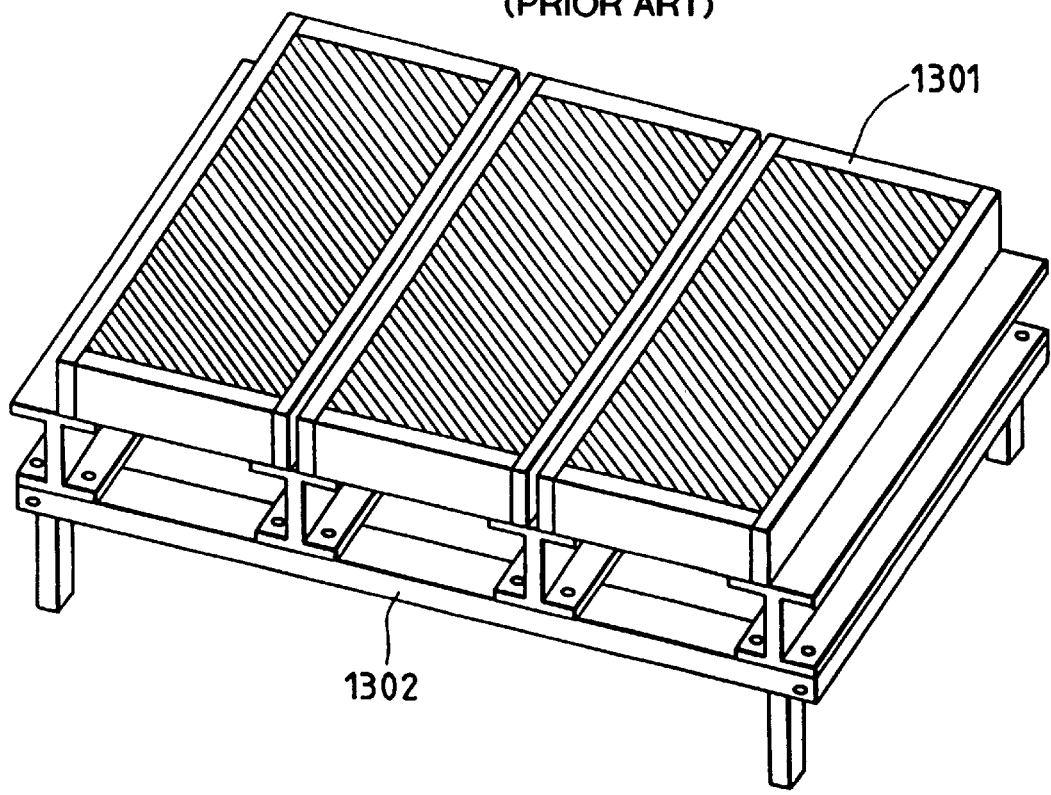
FIG. 13 is a perspective view of the frame mount type solar cell device in the conventional example.
Figure 14:
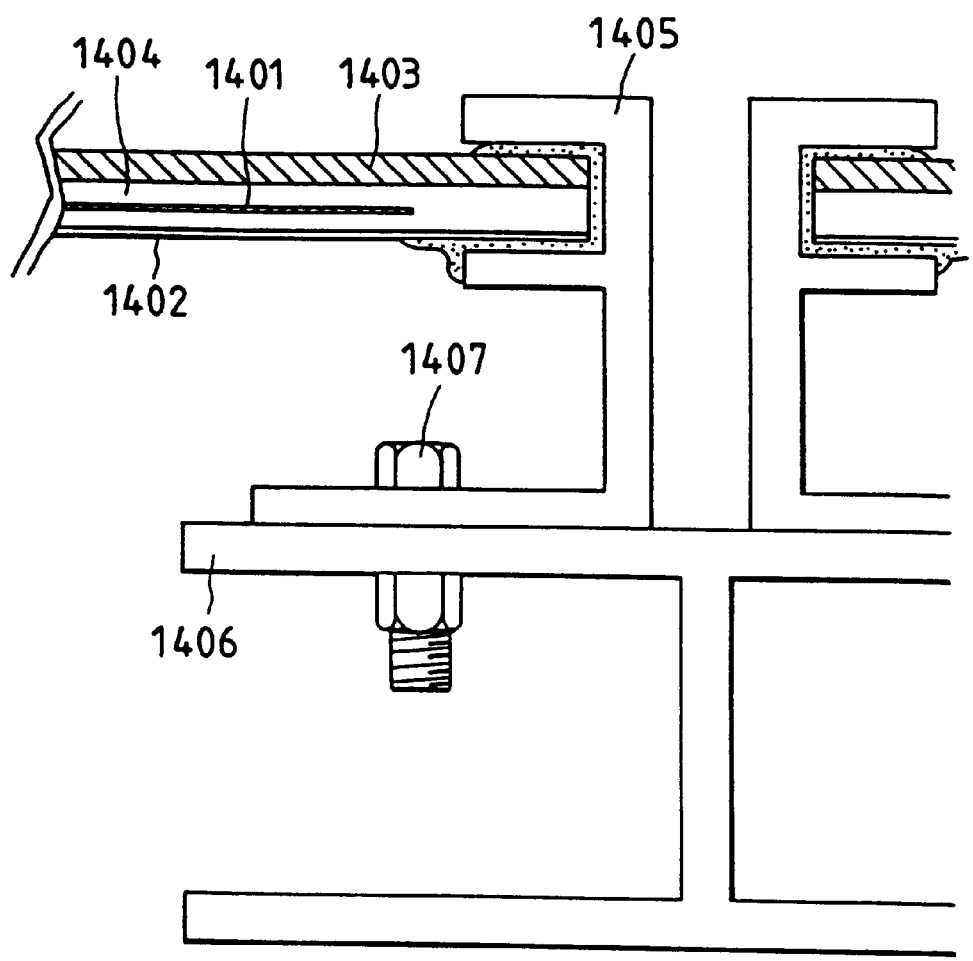
FIG. 14 is a partial, cross-sectional view of the frame mount type solar cell device in the conventional example.

A retaining clip 1104, as shown in FIG. 12, has a through hole 1105 through which a screw for fixing the retaining clip to the rafter passes, a mating portion 1106 to which a screw for making the electric conduction surer to the combination solar cell and roof member is attached, and a further mating portion 1107 to which a screw for making conduction sure to the metal conductive portion provided on the rafter is attached. After the module was fixed, the screws were attached to the mating portions 1106, 1107 of the retaining clip 1104.

When an eave edge metal sheet was attached as a means for electric conduction between the conductive portions 1102 provided on the respective wood rafters, portions near the eave-side ends of the conductive portions 1102 provided on the respective wood rafters were fixed with tapping screws in all of the rafters.

This achieved the electric conduction between the metal reinforcing members of the combination solar cell and roof members. The electric grounding method from the rafters is the same as in Example 1.

The roof members of the present example realized the mounting of combination solar cell and roof members and the electric grounding of the metal outside portions of combination solar cell and roof members with high work efficiency and at low cost, in the same manner as in Example 1, and they were the roof members also excellent in terms of the external view. Further, utilization of the wood rafters realized the roof members with higher work efficiency and at lower cost of installation in wood-structure houses normally using such rafters.

Example 4

The roof members of the present example are those to be installed by a roof mounting method, so called a batten seam roofing method with batten, for the ordinary metal roof members. The combination solar cell and roof members used in the present example were prepared in the same manner as in Example 1.

Figure 15:
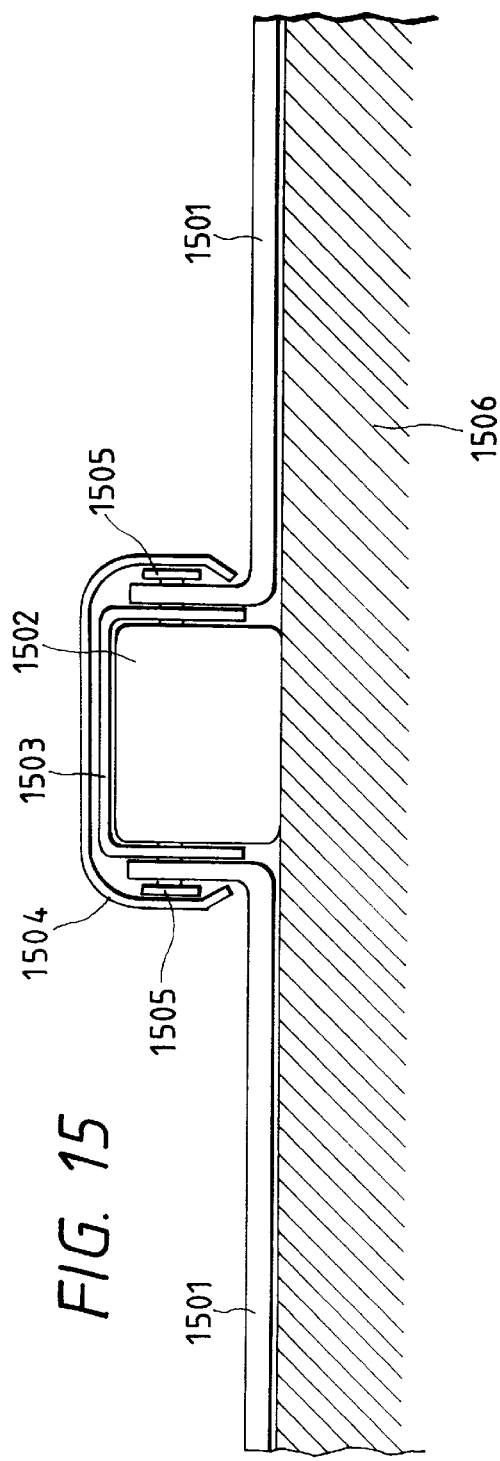
FIG. 15 is a cross-sectional, structural view of a batten seam type roof member with a batten according to the present invention.

FIG. 15 is a cross-sectional, structural view of the roof members of the present example.

Batten 1502 was mounted on sheathing roof board 1506.

The sheathing roof board 1506 was provided with notches in portions overlapping with the terminal lead-out portions located on the back side of combination solar cell and roof member, and serial connection of outputs from the solar cells through cables was made possible through the notch portions.

The batten 1502 is covered with a stainless steel sheet of a U-shape as a metal member 1503 for conduction to the combination solar cell and roof members 1501.

The combination solar cell and roof members 1501 were placed between battens 1502, and nails 1505 were put into the batten 1502 through the combination solar cell and roof member 1501 and the metal member 1503 to fix them.

Decorative cover 1504 was mounted finally.

The cable was attached to the metal member at the ridge-side edge of the roof. The electric conduction was achieved from the metal reinforcing members of the combination solar cell and roof members through the nails to the metal member incorporated with the batten, and the cable was finally guided into the interior, thus achieving the electric grounding lastly.

In the roof members of the present example, the metal members incorporated with the battens made possible the electric conduction of the combination solar cell and roof members arranged from the ridge to the eaves, and the roof members of the present example realized the installation and electric grounding of the metal reinforcing members of individual combination solar cell and roof members with high work efficiency and at low cost, in the same manner as in Example 1, while also keeping the roof members excellent in terms of the external view.

The battens were incorporated with the metal sheet, and utilization thereof permitted the roof members to be fixed by nailing popularly used for the roofs, thus further increasing the work efficiency.

Example 5

The roof members of the present example are those installed by a roof mounting method, called a batten seam roofing method, for the ordinary metal roof members.

The combination solar cell and roof members were prepared in the same manner as in Example 1.

Figure 16:
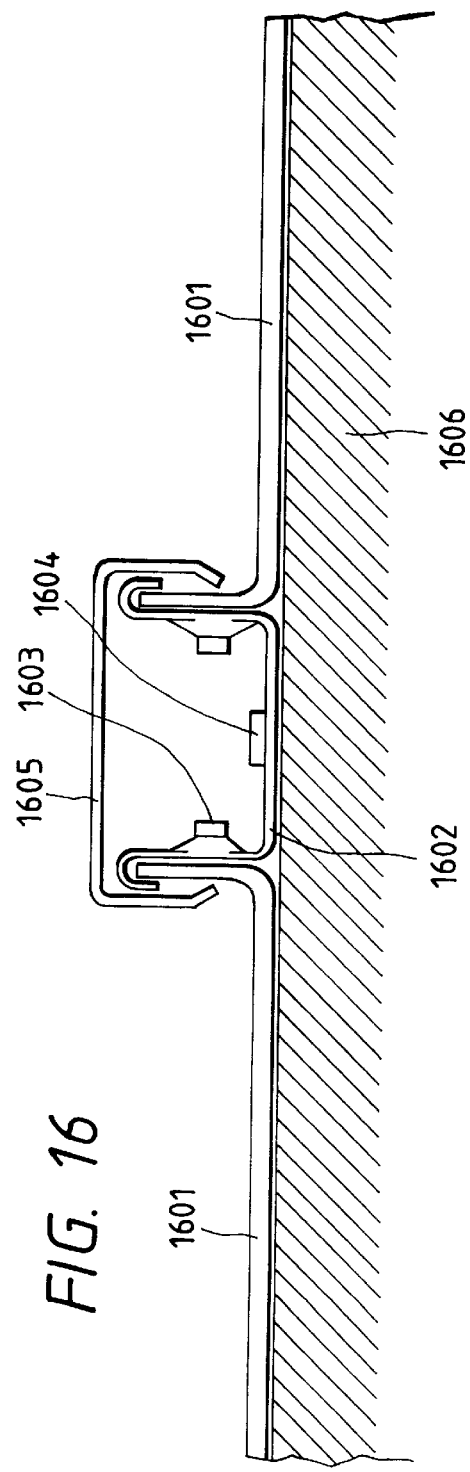
FIG. 16 is a cross-sectional, structural view of a roof member using a through retaining clip of the present invention.

FIG. 16 is a cross-sectional, structural view of the roof members of the present example.

The sheathing roof board 1606 was laid on the rafters. The sheathing roof board 1606 was provided with notches in terminal lead-out portions located on the back side of combination solar cell and roof member 1601, thereby enabling serial connection of outputs from the solar cells with cables through the notch portions.

The combination solar cell and roof members 1601 were placed on the sheathing roof board. The combination solar cell and roof members 1601 were retained by through retaining clips 1602 of stainless steel integrally formed from the ridge edge to the eave edge of roof and were fixed with screws 1603. The retaining clips were fixed to the sheathing roof board 1606 with tapping screws 1604. The cable was attached to the metal member at the ridge-side edge of the roof and the other end of the cable was guided into the interior to be electrically grounded. The decorative cover 1605 was finally attached thereover.

The roof members of the present example realized the mounting of combination solar cell and roof members and the electric grounding of the metal reinforcing members of combination solar cell and roof members with high work efficiency and at low cost, in the same manner as in Example 1, and they were the roof members also excellent in terms of the external view.

Further, use of the long retaining clip enhanced the reliability of fixing and realized the electric grounding surface, utilizing the space of the adjacent portion of combination solar cell and roof member and necessitating no processing of the roof substrate or the like.

Effects of the Invention

The present invention provided the cheap combination solar cell and roof member array easy to install and excellent in the external view and electric safety by adopting the above means.

The combination solar cell and roof members were installed without any frame therefor on the laid roof, which eliminated the material cost for the frame and the work for installation of the frame and which allowed considerable decrease of cost.

Since there was no frame projecting from the roof, the preferred external view was achieved with excellent unification of the roof and building.

The metal member was provided below the combination solar cell and roof member or in the adjacent portion between the solar cells and the metal reinforcing members of combination solar cell and roof members were electrically grounded through the metal members for electric conduction, whereby each of the combination solar cell and roof members was able to be electrically grounded without a need for use of many cables.

The metal sheet was placed as the metal member for electric conduction, whereby the metal member was able to be placed even if there was little space around the combination solar cell and roof member. Since the metal sheet is readily available, cheap, high in durability, and applicable without special processing, the invention made it possible to place the metal members for electric grounding with high work efficiency and at low cost.

When the metal member was the metal sheet mounted on the wood rafter, electric conduction became easier to the metal reinforcing member of combination solar cell and roof member. The reason is that the fixing portion of combination solar cell and roof member is located at the rafter part to enhance the strength more and electric conduction between them becomes easier by use of the fixing portion. Further, working amounts on the roof were able to be decreased by preliminarily fixing the metal sheet to the rafter. Since the wood rafters are generally used in buildings having the wood substrate structure, the invention made it possible to place the metal member without any great difference from the conventional roofing methods.

When the metal member was the metal rafter, cheaper and easier installation became possible. The metal rafters are generally used as structural members in buildings having the substrate structure such as the reinforcement structure. The electric grounding through this metal rafter obviated the need for placement of separate metal members for electric conduction.

When the metal member was the long retaining clip placed between adjacent combination solar cell and roof members, it realized simultaneous fixing of solar cell module and electric conduction and the roof members became high in work efficiency and low in installation cost.

Further, when the metal member was the metal sheet provided so as to cover the adjacent portion as well and, similarly, to function as a decorative cover over the adjacent portion, the roof members became excellent in terms of the cost, work efficiency, and external view.

When the combination solar cell and roof member was fixed by the retaining clips, there arose no problem of stress concentration on the bolted part of combination solar cell and roof member. This obviated the need for use of a heavy frame as a mount to the framework. It also became possible to fix the combination solar cell and roof member without any processing such as forming bolt holes in the combination solar cell and roof member. As a result, the arrangement made possible the weight reduction and cost reduction of combination solar cell and roof member. The metal roof members having been used heretofore as roof members are generally installed using engagement and retaining clips in the same manner as in the above fixing method. The shape of combination solar cell and roof member was made closer to the shape of these conventional metal roof members, which enhanced commonality of fixing method, commonality of accessories, etc. and which realized the roof members improved in work efficiency and having the excellent external view. It also made possible mixed roofing of the combination solar cell and roof members and the ordinary metal roof members.

Further, a part of the retaining clip was conductive and the electric conduction was achieved through the retaining clip between the metal reinforcing member of combination solar cell and roof member and the metal member laid on the roof substrate, whereby the electric conduction was attained without use of a cable between the combination solar cell and roof member and the metal member, thus realizing the roof members at low cost and with high work efficiency.

The retaining clip had the conductive screw and electric conduction was achieved among the metal reinforcing member of combination solar cell and roof member, the screw, and the conductive part of retaining clip, whereby the electric conduction was made surer between the metal outside portion of combination solar cell and roof member and the retaining clip.

When the metal reinforcing member was the metal frame member provided in at least a part of the circumference of combination solar cell and roof member, the sufficient strength was attained for the solar cell to be used as a roof member.

When the metal reinforcing member of combination solar cell and roof member was the metal sheet provided on the bottom side of the solar cell, the roof members were able to be formed in the shape similar to the conventional metal roof and the combination solar cell and roof members were excellent in terms of the strength of the roof, the external view, and the work efficiency. The combination solar cell and roof members were able to be mounted without a seam to the frame, were excellent in flashing, and were light in weight, so that the combination solar cell and roof members were those imparting no heavy load on the building and having high work efficiency of installation.

What is claimed is:

1. A roof member comprising:

a roof panel including a solar cell and a metal reinforcing member;

a conductive member supporting said metal reinforcing member, with said conductive member being electrically connected with said metal reinforcing member, and said conductive member including a metal sheet mounted on a wood member and being electrically grounded; and a retaining clip, at least a part of which has an electrically conductive property, making said metal reinforcing member and said conductive member electrically conductive, wherein said retaining clip is fixed to said metal sheet, wherein said retaining clip is a metal retaining clip, said metal retaining clip having an engaging portion of a hook shape for retaining said metal reinforcing member, a fixing portion to be fixed to a roof substrate, and a mating portion to which a metal screw is attached, wherein a part including said metal reinforcing member is sandwiched between the engaging portion of said retaining clip and said roof substrate, said retailing clip is fixed to said roof substrate in the fixing portion, the tip of said metal screw attached to said retaining clip is in a state of firm contact with said metal reinforcing member, and said metal reinforcing member and said retaining clip are made electrically conductive through said metal screw.

2. A roof member according to claim 1, wherein said wood member is a wood rafter.

3. A roof member according to claim 1, wherein said retaining clip has a mating portion, a screw urges said metal reinforcing member against said retaining clip in the mating portion, and electric conduction is achieved among said metal reinforcing member, said screw, and the conductive part of said retaining clip.

4. A roof member according to claim 1, wherein said metal reinforcing member is a metal frame member provided in at least a part of a circumference of said roof member.

5. A roof member according to claim 1, wherein said metal reinforcing member is a metal sheet provided on a bottom side of said roof panel.

6. A roof member according to claim 5, wherein said roof panel has an engaging portion obtained by plastic working of said metal sheet in a non-power-generating region, said engaging portion having at least a part without an insulating film, wherein said metal sheet is made electrically conductive to said conductive member provided on said roof substrate at least through the part without said insulating film.

7. A roof member comprising:

a roof panel including a solar cell and a metal reinforcing member;

a conductive member, with a plurality of said roof panels placed adjacent to said conductive member, said conductive member comprising a metal sheet mounted on a wood member and being electrically connected with said metal reinforcing members, and said conductive member being electrically grounded; and a retaining clip, at least a part of which has an electrically conductive property, said metal reinforcing member and said conductive member are made electrically conductive through said retaining clip, wherein said retaining clip is fixed to said metal sheet, wherein said retaining clip is a metal retaining clip, said metal retaining clip having an engaging portion of a hook shape for retaining said metal reinforcing member, a fixing portion to be fixed to a roof substrate, and a mating portion to which a metal screw is attached, wherein a part including said metal reinforcing member is sandwiched between the engaging portion of said retaining clip and said roof substrate, said retailing clip is fixed to said roof substrate in the fixing portion, the tip of said metal screw attached to said retaining clip is in a state of firm contact with said metal reinforcing member, and said metal reinforcing member and said retaining clip are made electrically conductive through said metal screw.

8. A roof member according to claim 7, wherein said conductive member is a metal sheet placed between two of said metal reinforcing members.

9. A roof member according to claim 8, wherein said conductive member is a retaining clip which fixes said roof panels adjacent to each other, with a length of said retaining clip extending between opposite edges of said roof panel.

10. A roof member according to claim 7, wherein said conductive member is provided so as to cover an edge portion of said roof panel.

11. A roof member according to claim 9, wherein said conductive member has a screw having an electrically conductive property, said screw being attached so as to contact said metal reinforcing member, and electric conduction is achieved among said metal reinforcing member, said screw, and said conductive member.

12. A roof member according to claim 7, wherein said metal reinforcing member is a metal frame member provided in at least a part of a circumference of said roof panel.

13. A roof member according to claim 7, wherein said metal reinforcing member is a metal sheet provided on a bottom side of said roof panel.

14. A roof member according to claim 13, wherein said roof panel has an engaging portion obtained by plastic working of said metal sheet in a non-power-generating region, said engaging portion having at least a part without an insulating film, wherein said metal sheet is made electrically conductive to said conductive member at least through the part without said insulating film.

15. A roof member according to claim 7, wherein said wood member is a wood rafter.

16. A roof member according to claim 11, wherein said retaining clip has a mating portion, a screw urges said metal reinforcing member against said retaining clip in the mating portion, and electric conduction is achieved among said metal reinforcing member, said screw, and the conductive part of said retaining clip.

17. A method of mounting a roof member having a roof panel with a solar cell and a metal reinforcing member, said method comprising the steps of:

providing a conductive member on a roof substrate;

mounting the roof panel on the conductive member;

making the conductive member electrically conductive to the metal reinforcing member by using a retaining clip, with the conductive member comprising a metal sheet mounted on a wood member, a part of which is electrically conductive;

electrically grounding the conductive member; and fixing the retaining clip to the metal sheet, wherein the retaining clip is a metal retaining clip, the metal retaining clip having an engaging portion of a hook shape for retaining the roof member, a fixing portion to be fixed to a roof substrate, and a mating portion to which a metal screw is attached, wherein a part including the metal reinforcing member is sandwiched between the engaging portion of the retaining clip and the roof substrate, and the retailing clip is fixed to the roof substrate in the fixing portion so that the tip of the metal screw attached to the retaining clip is in a state of firm contact with the metal reinforcing member, wherein the metal reinforcing member and the retaining clip are made electrically conductive through the metal screw.

18. A method of mounting a roof member according to claim 17, wherein said wood member is a wood rafter.

19. A method of mounting a roof member according to claim 17, wherein the retaining clip has a screw having an electrically conductive property, the screw being attached so as to contact the metal reinforcing member, and electric conduction is achieved among the metal reinforcing member, the screw, and the conductive member.

20. A method of mounting a roof member according to claim 17, wherein the metal reinforcing member is a metal frame member provided in at least a part of the circumference of the roof member.

21. A method of mounting a roof member according to claim 17, wherein the metal reinforcing member is a metal sheet provided on a bottom side of the roof panel.

22. A method of mounting a roof member according to claim 21, wherein the roof panel has an engaging portion obtained by plastic working of the metal sheet in a non-power-generating region, and the engaging portion of the roof panel having at least a part without an insulating film, wherein the metal sheet is made electrically conductive to the conductive member provided on the roof substrate at least through the part without the insulating film.

23. A method of mounting a roof member having a roof panel with a solar cell and metal reinforcing member, said method comprising the steps of:

providing a plurality of the roof panels adjacent to at least one common conductive member;

electrically connecting the conductive member with the metal reinforcing members;

electrically grounding the conductive member;

making the metal reinforcing member and the conductive member electrically conductive through a retaining clip, with the conductive member being a metal sheet mounted on a wood member, a part of which has an electrically conductive property; and fixing the retaining clip to the metal sheet, wherein the retaining clip is a metal retaining clip, the metal retaining clip having an engaging portion of a hook shape for retaining the metal reinforcing member, a fixing portion to be fixed to a roof substrate, and a mating portion to which a metal screw is attached, wherein a part including the metal reinforcing member is sandwiched between the engaging portion of the retaining clip and the roof substrate, the retaining clip is fixed to the roof substrate in the fixing portion, the tip of the metal screw attached to the retaining clip is in a state of firm contact with the metal reinforcing member, and the metal reinforcing member and the retaining clip are made electrically conductive through the metal screw.

24. A method of mounting a roof member according to claim 23, wherein the conductive member is a metal sheet placed between the roof panels.

25. A method of mounting a roof member according to claim 24, wherein the conductive member is a retaining clip which fixes the roof panels adjacent to each other, with a length of the retaining clip extending between opposite edges of said roof panel.

26. A method of mounting a roof member according to claim 23, wherein the conductive member is provided so as to cover an edge portion of the roof panel.

27. A method of mounting a roof member according to claim 25, wherein the conductive member has a screw having an electrically conductive property, the screw being attached so as to contact the metal reinforcing member, and electric conduction is achieved among the metal reinforcing member, the screw, and the conductive member.

28. A method of mounting a roof member according to claim 23, wherein the metal reinforcing member is a metal frame member provided in at least a part of a circumference of the roof panel.

29. A method of mounting a roof member according to claim 23, wherein the metal reinforcing member is a metal sheet provided on a bottom side of the roof panel.

30. A method of mounting a roof member according to claim 29, wherein the roof panel has an engaging portion obtained by plastic working of the metal sheet in a non-power-generating region, the engaging portion having at least a part without an insulating film, wherein the metal sheet is made electrically conductive to the conductive member at least through the part without the insulating film.

31. A method of mounting a roof member according to claim 23, wherein the wood member is a wood rafter.

32. A method of mounting a roof member according to claim 29, wherein the retaining clip has a mating portion, a screw urges the metal reinforcing member against the retaining clip in the mating portion, and electric conduction is achieved among the metal reinforcing member, the screw, and the conductive part of the retaining clip.

33. A roof member comprising:

a roof panel including a solar cell and a metal reinforcing member;

a conductive member supporting said metal reinforcing member, with said conductive member being electrically connected with said metal reinforcing member, and said conductive member being electrically grounded; and a retaining clip, at least a part of which has an electrically conductive property, making said metal reinforcing member and said conductive member electrically conductive, wherein said retaining clip is a metal retaining clip, said metal retaining clip having an engaging portion of a hook shape for retaining said metal reinforcing member, a fixing portion to be fixed to a roof substrate, and a mating portion to which a metal screw is attached, and wherein a part including said metal reinforcing member is sandwiched between the engaging portion of said retaining clip and said roof substrate, said retaining clip is fixed to said roof substrate in the fixing portion, and a tip of said metal screw attached to said retaining clip is in contact with the surface of said metal reinforcing member such that said metal reinforcing member and said retaining clip are made electrically conductive through said metal screw.

34. A method of mounting a roof member having a roof panel with a solar cell and a metal reinforcing member, said method comprising the steps of:

providing a conductive member on a roof substrate;
mounting the roof panel on the conductive member;
making the conductive member electrically conductive to the metal reinforcing member by using a retaining clip, a part of which is electrically conductive; and
electrically grounding the conductive member, wherein
the retaining clip is a metal retaining clip, the metal retaining clip having an engaging portion of a hook shape for retaining the roof member, a fixing portion to be fixed to a roof substrate, and a mating portion to which a metal screw is attached, wherein a part including the metal reinforcing member is sandwiched between the engaging portion of the retaining clip and the roof substrate, the retaining clip is fixed to the roof substrate in the fixing portion, and a tip of the metal screw attached to the retaining clip is in contact with the surface of the metal reinforcing member, wherein the metal reinforcing member and the retaining clip are made electrically conductive through the metal screw.

* * * * *

UNITED STATES PATENT AND TRADEMARK OFFICE
CERTIFICATE OF CORRECTION

PATENT NO. : 6,269,596 B1
DATED : August 7, 2001
INVENTOR(S) : Takashi Ohtsuka et al.

Page 1 of 1

It is certified that error appears in the above-identified patent and that said Letters Patent is hereby corrected as shown below:

Column 14,
Line 51, "claim 11," should read -- claim 7, --.

Column 15,
Line 10, "retailing" should read -- retaining --.

Column 16,
Line 33, "claim 29," should read -- claim 23, --.

Signed and Sealed this

Ninth Day of April, 2002

Attest:

Attesting Officer

JAMES E. ROGAN
Director of the United States Patent and Trademark Office